Re. 25607
March 4, 1958     A. K. LITTWIN     2,825,854
APPARATUS FOR AND METHOD OF DEMAGNETIZING
Filed April 1, 1957     2 Sheets-Sheet 1
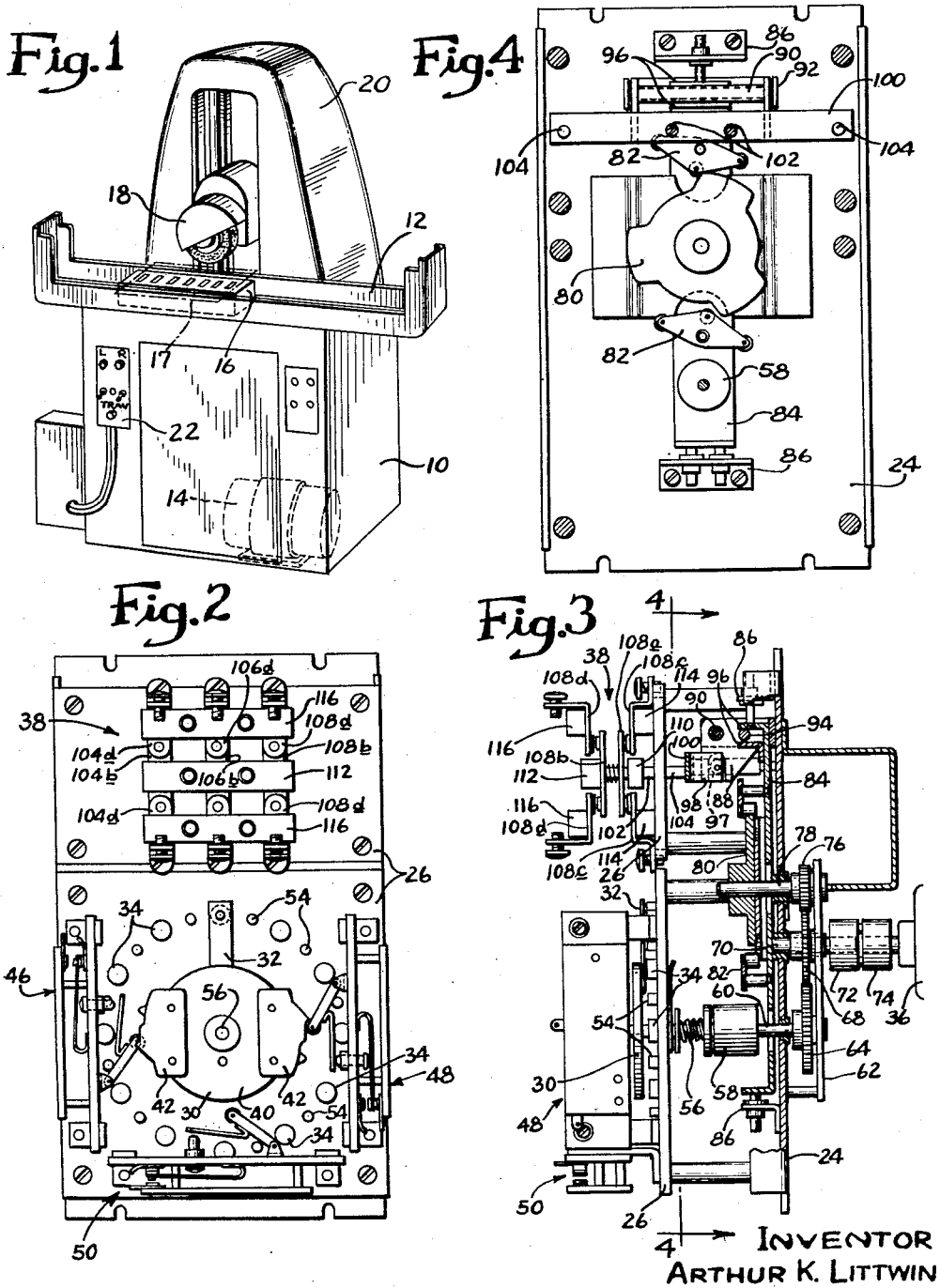
INVENTOR
ARTHUR K. LITTWIN
by: Horton, Davis, Brewer & Bergman
ATTYS INVENTOR
ARTHUR K. LITTWIN
by: Horton, Davis, Brewer & Brugman
ATTYS.

United States Patent Office 2,825,854
Patented Mar. 4, 1958

2,825,854

APPARATUS FOR AND METHOD OF DEMAGNETIZING

Arthur K. Littwin, Lincolnwood, Ill., assignor to Littwin Family Trust No. 1, Chicago, Ill., Leo F. Littwin, trustee Application April 1, 1957, Serial No. 650,032

15 Claims. (Cl. 317—157.5)

The present invention relates generally to means for demagnetizing an electromagnet.

The device has particular adaptation in connection with an electromagnetic chuck used for holding a work piece thereon in a machine for performing an operation on the piece. When it is desired to remove the work piece from the chuck, the chuck, together with the work piece, is demagnetized to facilitate removing the work piece from the chuck. An electromagnetic chuck of the character indicated above may be used, for example, on a machine tool on which a work piece is held on a table or other supporting means for performing a grinding, cutting, or similar operation thereon. For such operation the magnetic holding power is, of course, substantial in order to properly hold the work piece against the strong forces encountered. It is difficult to remove the work piece from the chuck after the operation is completed, because of the residual magnetism remaining after the magnetizing force is terminated. Therefore, the chuck, with the work piece thereon, is demagnetized to eliminate or minimize such residual magnetism.

An object of the invention is to provide a completely novel apparatus and method for demagnetizing a chuck, of the nature indicated above.

The magnetic chuck of the kind herein concerned is demagnetized by imposing thereon current in successively reversed directions and at successively reduced voltage, in a series of steps, the last one of which leaves the chuck with only a relatively small residual magnetism. The direct current supplied through the chuck is provided by a rectifying means from an alternating current source. Heretofore in demagnetizing such chucks, it has been customary to reduce the voltage in the demagnetizing operation by interposing a resistor or potentiometer in the direct current circuit leading to the chuck.

The present invention embodies an entirely new principle in that the power supply to the chuck is derived from an alternating current source and, instead of reducing the voltage in the direct current circuit by means of interposing a resistor or potentiometer therein, the alternating current source is interrupted, and at the intervals at which it is interrupted the transformer for supplying the desired voltage to the electromagnet is tapped at various voltage value points, with consequent elimination of disadvantages connected with the previous manner of reducing the voltage mentioned above.

Another object therefore of the invention is to provide apparatus and method for demagnetizing an electromagnet which includes supplying power for the demagnetizing operation from an alternating current source, and interrupting the alternating current source and at periods of such interruption to reduce the voltage imposed on the electromagnet in a series of steps by tapping the alternating current source at successively lesser voltage value points.

A further object is to provide apparatus and method for demagnetizing an electromagnet in fewer steps than has heretofore been practicable with resulting advantages that less time is required for the operation and less wear is occasioned on the mechanical elements utilized in the apparatus.

A further object is to provide apparatus and method for demagnetizing an electromagnet which is equally effective regardless of the size of the work piece held on the electromagnet and magnetized therewith.

A further object is to provide apparatus and method for demagnetizing an electromagnet in which all counter E. M. F. is effectively eliminated in the electromagnet such as would otherwise be occasioned by reduction of voltage imposed thereon as when a variable resistor is utilized in the direct current circuit.

A further object is to provide apparatus and method for demagnetizing an electromagnet including a novel arrangement for substantially eliminating arc and heat from such arc such as are encountered in breaking circuit in a direct current circuit.

Still another object is to provide apparatus and method for demagnetizing an electromagnet in which the necessary power consumption is substantially reduced relative to apparatus heretofore known.

A further object is to provide an arrangement for demagnetizing an electromagnet utilizing a direct current circuit for producing the magnetizing power, which is free of series resistances for reducing voltage therein, and low impedance is occasioned in the circuit.

Another object is to provide an arrangement for demagnetizing an electromagnet in which a novel mechanical means is provided for producing the reversal of the polarity of the direct current and breaking the alternating current circuit, as is done in the use of the apparatus as described above.

Other objects and advantages of the invention will appear from the following detailed description taken in conjunction with the accompanying drawings in which:

Figure 1 is a general view of a machine tool of a kind utilizing an electromagnetic chuck of the character to which the present invention is particularly adapted;

Fig. 2 is a front view of an instrument incorporating the physical or mechanical device for operating and controlling the demagnetizing means;

Fig. 3 is a side view taken from the right of Fig. 2;

Fig. 4 is a view taken substantially on line 4—4 of Fig. 3; and

Figure 5:
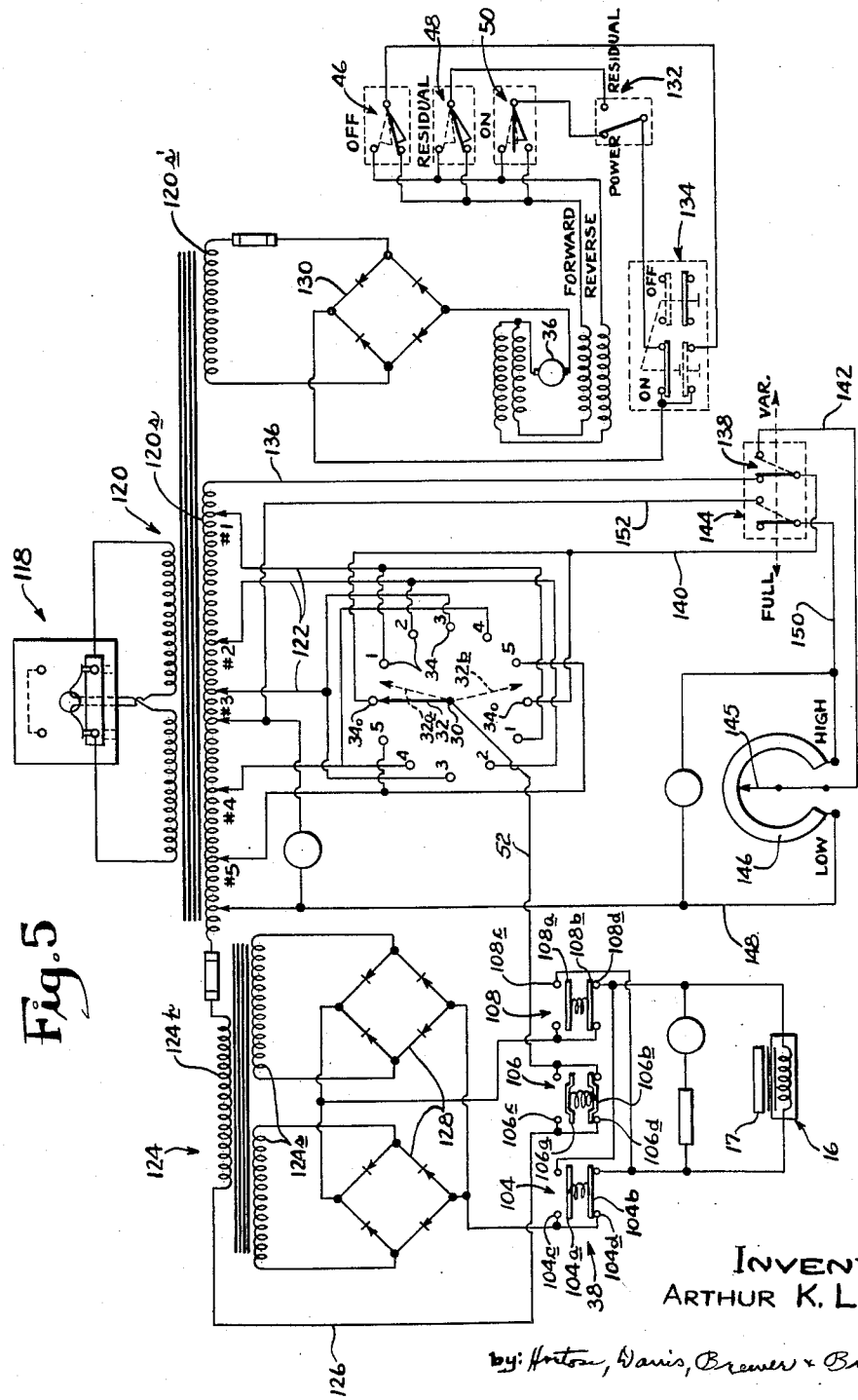
Fig. 5 is a diagram of the circuit utilized in the apparatus.

Referring now in detail to the drawings, and particularly to Fig. 1, the device as shown in this figure is a machine tool embodying an electromagnetic chuck. The illustration of this figure is semi-diagrammatic in that most details are omitted for the sake of clarity, since the machine itself does not constitute a part of the present invention. The device or machine may be referred to as a machine tool and is utilized for performing a working operation on a work piece such as is capable of being held by an electromagnetic chuck. The operation may be a grinding, cutting, or similar operation. The machine includes a suitable base 10 having a table 12 that is arranged for reciprocation back and forth along the base, in direction transverse to the direction of view, and is driven by a suitable driving means such as an electric motor 14. The table 12 is provided with a chuck 16 of the character indicated above, but which is shown herein in purely schematic arrangement. A work piece 17 such as a metal piece, is held on the chuck 16 and a grinding or similar operation is performed by a grinding wheel 18 mounted in an upstanding portion 20 of the machine. As the table 12 reciprocates back and forth as stated, the grinding wheel 18 performs a grinding operation thereon and the wheel itself moves transversely relative to the direction of reciprocation of the table for performing the operation over the entire surface of the work piece. A control panel 22 is indicated diagrammatically and is located on the machine at an appropriate and convenient location for access by the operator. The panel 22 provides a means for mounting the instrument shown in Figs. 2, 3, and 4.

Attention is now directed to Figs. 2, 3, and 4 which illustrate the mechanical device embodying certain of the operating and control parts as well as portions of the control circuit. Attention is also directed to Fig. 5 illustrating the electric circuit and indicating certain mechanical elements incorporated in the instrument of Figs. 2, 3, and 4. In the following description attention may be directed to Figs. 2 to 5, unless otherwise specifically indicated. The structure of these figures may be included in an arrangement with other mechanical devices, such as manually operated switches, etc.

The panel structure of Figs. 2 to 4 includes a back plate 24 and a front plate 26 suitably secured together such as by bolt and spacer assemblies 28 of conventional kind. The structure includes the rotor 30 having an arm 32 arranged for serially or sequentially engaging terminal contact elements or switch elements 34 arranged in a circle on the front plate 26. The rotor is driven by means of a suitable electric motor 36. The motor 36 is also arranged for operating a plurality of switches in a switch bank 38, the details of which will be described hereinbelow. The rotor 30 and associated contact elements, the motor 36, and the switch bank 38 are all also included in the circuit diagram of Fig. 5.

The rotor 30 includes a circular plate 40 of suitable insulating material and is provided with cams 42 of suitable shape and positioned relatively on the rotor plate for engaging certain limit switches in predetermined positions of rotation of the rotor. The limit switches mentioned are indicated at 46, 48, and 50, respectively (also Fig. 5). These switches are of conventional nature, and the details thereof need not be entered into herein. They are so constructed and so positioned relative to the rotor and the cams 42 as to be closed or opened at the desired times for performing certain control operations to be referred to later.

The arm 32 is fixed on the rotor plate 40 in any suitable manner and is made of conducting material or contains a conductor therein and forms a switch member cooperating with counterpart switch elements 34, for controlling a portion of the circuit. Leading to the arm 32 is a common line 52 (Fig. 5). The elements 34 are mounted on the front plate 26 of the structure, this plate being preferably entirely of insulating material or at least containing insulating material at appropriate places. The elements 34 are connected with certain lines or conductors which will be referred to in detail later in connection with the circuit of Fig. 5. Between each two adjacent elements 34 is a stud or rest 54 for supporting the switch arm 32 when the latter is removed from the elements 34. The studs 54 are insulated from all other electrical portions of the apparatus and serve merely as a mechanical rest means for maintaining the desired alignment of the arm 32. It will be noted that the arm 32 is so dimensioned and the elements 34 are so spaced apart that the switch arm is enabled to assume a position between two adjacent elements 34 and be entirely out of contact with both of them, completely interrupting the circuit through the elements 34. The studs 54 aid in maintaining the desired alignment of the switch arm 32, both in continuous movement between adjacent elements 34 and also when the switch arm is stationarily disposed, temporarily, between the switch elements 34.

The rotor 30 is suitably secured to a shaft 56 appropriately mounted in the front plate 26 of the structure, this shaft being connected through a suitable coupling 58, which is preferably a flexible coupling, to another shaft 60 mounted in the back plate 24 and another supporting plate 62, and having secured thereon a gear 64. The gear 64 is in mesh with another gear 68 secured to a shaft 70 also suitably mounted for rotation on the back plate 24 and the mounting plate 62. On the outer or rear end of the shaft 70 is a coupling element 72 forming a flexible coupling with another coupling element 74 mounted on the drive shaft of the motor 36. Thus, upon rotation of the motor 36, drive is transmitted to the rotor 30 for rotating the latter and sweeping the switch arm 32 over the switch elements 34.

The switches of the switch bank 38 move in a reciprocating manner and in directions transverse to the line of view of the observer and along a line parallel with the axis of the drive shaft of the motor 36. The drive from the motor 36 to the switches involves a means for converting rotary motion to reciprocating motion in the directions indicated, and includes a third gear 76 in mesh with the gear 68 and secured to a shaft 78 mounted for rotation in the back plate 24 and the mounting plate 62. On the inner end of the shaft 78, i. e., on the front side of the back plate 24, is a cam 80 having preferably a generally triangular shape (Fig. 4) and arranged for engaging cam followers 82 mounted on and carried by vertically reciprocating member 84 which is mounted on the back plate by suitable guide brackets 86. The guiding action may be provided by pins on the member 84 sliding in apertures in the brackets, or other suitable equivalent arrangement. The cam follower is of conventional kind.

Cooperating with and actuated by the reciprocating member 84 is a bell crank lever 88 pivoted at 90 on a bracket 92 (Fig. 4). The bell crank member 88 may be of any desired transverse dimension and preferably is at least as wide as the switch bank 38 as viewed in Fig. 2, for convenience in operation of the latter. The bell crank lever 88 includes a pin or shaft 94 engaged between fingers 96 of the reciprocating member 84. The bell crank lever further has suitable pivot elements such as pins 97 pivotally connected with arms 98 on a transverse plate 100, the latter having pins or rods 102 extending forwardly into the switch bank 38 and connected with certain movable elements of the latter. The transverse plate 100 has suitable guiding engagement with pins or rods 104 at the terminal ends of the plate (Figs. 3 and 4) for maintaining the necessary alignment of the plate. This plate may actually be in the form of a bar extending transversely the full extent of the structure. From the foregoing it will appear that the member 84 reciprocates in vertical directions and rocks the bell crank lever 88 about the pivot 90, to cause reciprocation of the arms 98 and rods 102 in transverse directions as noted above.

The switch bank 38 includes three separate switches shown most clearly in Fig. 5, these switches being 104, 106, and 108, respectively. Each switch includes bars and terminal elements for certain gang operation. The switch 104 includes contact bars 104a and 104b and terminal element sets 104c and 104d; the switch 106 includes contact bars 106a and 106b and contact terminal sets 106c and 106d; the switch 108 includes contact bars 108a and 108b as well as contact terminal sets 108c and 108d. The contact bars 104a, 106a, and 108a are ganged for movement in unison and are engaged and actuated by a transverse switch bar 110 (Fig. 3), and similarly the contact bars 104b, 106b, and 108b are ganged for movement in unison and are engaged and actuated by a transverse switch bar 112 (Fig. 3). The contact bars may be slidably mounted on pins interconnecting the transverse switch bars 110 and 112. The contact terminal elements 104c, 106c, and 108c are mounted on a pair of transverse bars 114 disposed for convenience above and below, respectively, the transverse bar 110. In a similar manner the contact terminal elements 104d, 106d, and 108d are mounted on another pair of transverse bars 116 mounted for convenience above and below the transverse bar 112. The transverse bars 110 and 112 are mounted for movement in tandem relation on the rods 102 (Fig. 4) so that upon movement of the latter the transverse switch bars 110 and 112 are moved together, with certain consequent sequential operation of the switch bars connected thereto, as will be explained in detail hereinbelow.

Thus, from the foregoing it will be seen that upon operation of the motor 36 the rotor 30 is rotated with consequent contact make and break operation between the switch arm 32 and the switch elements 34. The switches in the switch bank 38 are operated in certain synchronized relation thereto. Upon rotation of the rotor 30 the cams 42 actuate the switches 46, 48, and 50 in certain timed relationship.

Attention is next directed to the circuit diagram of Fig. 5. A suitable source of alternating current 118 is provided leading to a transformer 120. The secondary 120s of the transformer is provided with a number of conductors 122 tapped therein at various voltage points therealong and are connected to various ones of the switch elements 34 as will be explained more fully hereinbelow. Connected with the secondary 120s is another transformer 124, the primary 124p of which is connected serially with the secondary 120s of the first transformer. At the opposite end of the primary 124p is another conductor 126 connected through the switch means 106 with the conductor 52, referred to above, which is a common leading to the switch arm 32 on the rotor 30. A circuit is thus completed from the secondary 120s of the first transformer through the primary 124p of the second transformer, conductor 126, switch means 106, conductor 52, switch arm 32, and selected ones of the conductors 122 which lead from the switch elements 34 to the secondary 120s of the first transformer.

The second transformer 124 includes one or more secondary windings 124s leading to rectifying means 128 which converts the alternating current provided from the transformer 124 to direct current, and delivers it to the chuck 16 through the switches 104 and 108, these two switches being reversing switches for reversing the polarity of the direct current delivered to the chuck 16, shown in this diagram in direct current circuit with those switches.

Another secondary winding 120s' is provided in the transformer 120 and leads to rectifying means 130 providing direct current to the motor 36 which is of reversing type. This motor, as shown in the circuit, is controlled by the switches 46, 48, and 50, referred to above, the switches in turn being actuated by the cams 42 on the rotor 30. Manually operated switch means 132 is provided for controlling the switches 48 and 50, and selectively placing them in circuit. Serially arranged with the switch 132 is another manually operated switch 134 which is arranged for on-off switching, and consequent placing of the switches 132 and 46 selectively in circuit.

Attention is directed next to that portion of the circuit of Fig. 5 in the center thereof and derived from the secondary 120s of the transformer 120. A common line or conductor 136 leads from the secondary 120s from the end opposite the transformer 124 to a switch 138 which connects the common conductor selectively with conductors 140 and 142. The switch means 138 is arranged for cooperation with an associated switch 144, and are operated in gang or in tandem between the full and dotted line positions indicated. Referring first to the conductor 140 which is connected with the conductor 136 when the switch 138 is in full line position, this conductor (140) leads to a certain two of the switch elements 34. These two elements to which the conductor 140 is connected are indicated, for convenience, as $34_0$. The switch elements 34 are arranged in two series. They number twelve in all, and each series includes six. The elements in each series are arranged serially relative to the element $34_0$, which may be referred to as the main or home element, and, with relation to the latter, are numbered 1 to 5 inclusive. The switch elements, namely, Nos. 1 to 5, are connected, respectively, with the conductors 122, referred to above and which are connected to the secondary 120s at various voltage value points therealong. The two series of these elements 34, as will be obvious, are parallel, each serving the same purpose as the other series or sets, and the switch arm 32 in its contact or sweeping motion engages the one or the other set of elements depending upon its starting position.

When the switch means 138 is in its opposite or dotted line position, the conductor 142 is connected with the conductor 136. The conductor 142 is connected with an arm 145 of a potentiometer or variable resistance 146 from the remote end of which a conductor 148 leads to the secondary 120s. The end of the potentiometer opposite the said remote end is connected through a conductor 150 which, in turn, is connected through the switch 144, when the latter is in its dotted line position, to a conductor 152 leading to the secondary 120s at a point spaced from the connection of the conductor 148 thereto.

The switches 138 and 144, as mentioned above, are arranged for tandem operation and may be arranged in a suitable mechanical control knob located conveniently on the panel 22. Assuming first the switch means as being in the full line position as indicated, the following is a description of the operation when it is desired to demagnetize the electromagnet in a series of steps of opposite polarity current of successively reduced value.

Assume first a condition in which the switch arm 32 and the switches 104 and 108 are in the full line positions indicated in the diagram. In such position, the present circuit remains simply in an "on" position, and the electromagnet is energized to hold the work piece in position thereon. The current delivered to the electromagnet is at full voltage value according to the capacity of the transformer 120. In such condition the circuit is as follows: from the secondary 120s to the primary 124p of the second transformer 124, conductor 126, switch 106, conductor 52, switch 32, the associated switch element $34_0$, conductor 140, switch 138, and conductor 136 to the secondary 120s. The direct current circuit to the chuck, as will be understood, in this condition is closed through the switches 104 and 108, which are in corresponding positions such as the lower position of the two possible indicated in the diagram. So long as the operation is being performed on the work piece, the circuit is permitted to remain in the closed position as described. In the normal operation of the machine tool of Fig. 1, and without the use of the demagnetizing apparatus, the switch means 134 and 132 remain in the full line positions indicated in the diagram. The switch 134 is in the "on" position, and the circuit continues from this switch through the switch 132 to the switch 50 which is in open position. The circuit to the motor 36 is therefore open and the motor is idle, and, consequently, the switch arm 32 remains stationary in engagement with the contact terminal element $34_0$.

Next, assume it is desired to demagnetize the electromagnet. The operator moves the switch 134 from the full line "on" position to the dotted line "off" position. This closes the circuit from the switch 134 to the switch 46, the the latter closes the circuit to the motor 36 for driving the motor in forward direction. It will be understood that the switches 46, 48, and 50 are normally biased to their position corresponding to the forward drive of the motor 36 which is in the lower position as the elements are arranged in Fig. 5. The switches are moved in opposite direction to the other extreme for closing the circuit for reversing the motor 36 by the cams 42 in accordance with the rotation of the latter and the relative spacing or positioning of the cams on the rotor 30 relative to the positions of the switches 46, 48, and 50. The motor in so driving forward rotates the switch arm 32 in clockwise direction (as viewed in Fig. 5), and it is brought to rest at the dotted line position 32b at an open circuit position immediately after passing the element 34 at position No. 5 of the series relating to the home terminal element $34_0$ from which the switch arm started.

The circuit is successively opened and closed in the sweep of the switch arm 32 over the elements 34, and each time that the circuit is opened between two adjacent contacts, the polarity of the direct current delivered to the chuck 16 is reversed. This is accomplished by the switch means 104, 106, and 108. These switches, as was explained above, are actuated by mechanism driven by motor 36 and are timed with respect to the switch arm 32 so that the circuit is broken through the switch arm 32 intermittently, and when this circuit is broken, the direct current to the chuck is reversed in polarity. Upon the switch arm 32 moving toward, for example, a first open circuit position such as between the element $34_0$ and the next station No. 1, the switch 106 is opened before the switch arm leaves the terminal element $34_0$. The switch 106 opens the A. C. circuit which includes the switch arm 32, and while this circuit is open, the switch means 104 and 108 are reversed by moving the respective bars 104a and 104b in the one switch, and 108a and 108b in the other switch, from the position they happen to be assuming (such as the lower position in Fig. 5) to the opposite position, from which it will be seen that the polarity of the current delivered to the chuck 16 is reversed. After the switch bars have engaged the opposite contact elements, the switch means 106 is closed. This latter switch is closed after the switch arm 32 engages the next element 34, e. g., the No. 1 element.

This operation is repeated at each of the elements 34 and the spaces therebetween until the switch arm 32 reaches, or closely approaches, the position indicated in the dotted line position at 32b. To stop the switch arm at the latter position, the respective cam means 42 moves away from the switch 46 and enables the switch to close in the opposite direction (Fig. 5) to reverse the motor 36. The momentum of the motor tends to carry the switch arm past station No. 5 and on to the next terminal element $34_0$, but the reversal of the motor prevents this overthrow. The reversal of the motor also reverses the rotor 30, and the cam means 42 also reverses and moves the switch 46 to an intermediate position in which the circuit to the motor 36 is open. The motor is brought to a standstill at the desired position in which the switch arm 32 is at the dotted line position indicated at 32b and prevents its making circuit through the element $34_0$ at the bottom.

In the operation just described, the voltage value of the current imposed on the chuck is successively reduced. This will be seen from the fact that the switch elements 34, at stations Nos. 1, 2, 3, etc., are connected with the secondary 120s at successively lesser voltage values as indicated at the tapped connections on the secondary as indicated at No. 1, No. 2, etc.

The invention provides for interrupting the current at its source. The source is alternating current, and this can be interrupted with facility and without the disadvantages associated with interrupting direct current, such as arcing, with objectionable heat resulting therefrom, etc. Each time the source is interrupted the switch arm 32 closes the circuit successively in different circuit portions representing successively lesser values of voltage according to the tappings of the secondary 120s. Each time the circuit is so interrupted, the switch means 104 and 108 reverse the direct current imposed on the chuck 16.

The demagnetization of the electromagnet of the chuck 16 may be achieved by imposing constant voltage thereon for varying intervals of time or varying voltages for constant intervals of time. The latter method is utilized in the present instance. The rotation of the switch arm 32 is of constant speed, whereby the voltage imposed on the electromagnet at each of the stations 34 No. 1, 34 No. 2, etc., is for the same interval of time, but the value of the voltage varies. Accordingly, if, for example, 115 volts originally should be imposed on the electromagnet for magnetizing it for holding the work piece, this value is reduced uniformly in six steps so that the residual magnetism remaining after the last step is of relatively small value. The operator may then easily lift the work piece from the chuck. It will be understood that the polarity of the current imposed on the electromagnet at any stage in the operation explained, completely neutralizes the magnetism imposed in the opposite direction at the period previous thereto so that after the last step in the demagnetizing operation the residual magnetism is no greater than that represented by the tapping No. 5 on the secondary 120s, and in practice is usually less than that.

When, after such a demagnetizing operation, it is desired to connect the circuit for magnetizing the chuck for holding a work piece thereon, the operator moves the switch 134 from the "off" position to the "on" position. This closes the circuit through the switch 132 to the switch 50. The latter switch was at normal position, closing the circuit for driving the motor 36 forwardly, but so long as the switch 134 was open to the switch 50, as was the case when the latter was in the "off" position, the motor remains at a standstill. However, upon turning the switch 134 to "on" position as just explained, the circuit being closed to the motor 36, the latter rotates the switch arm 32 from the position indicated at 32b, which it assumed after the demagnetizing operation to the lowermost position in engagement with the contact terminal element $34_0$, i. e., the lower one, opposite to that assumed above in the description of the operation. Since the switch arm moves only a short distance which is half the distance between two adjacent switch elements 34, the inertia of the motor is not so great and does not carry the switch arm 32 beyond the associated switch element $34_0$. However, if it should, the appropriate cam means 42 on the rotor would throw the switch blade of the switch 50 to the reversing position to reverse the motor the appropriate amount for positioning the switch arm on the element $34_0$. It will be understood that the cam means and the blade of the switch 50 are so related that when the switch arm 32 is on the element $34_0$, the blade of the switch 50 is in an intermediate open position. After the switch arm 32 thus engages the element $34_0$, the apparatus remains at rest until it is again desired to demagnetize the electromagnet. When that is desired, the operator repeats the demagnetizing cycle described above. In this cycle the switch arm 32 sweeps from its lower position to an upper position just short of the uppermost switch element $34_0$.

The apparatus includes a further control that may be utilized in certain situations, such as when the operator wishes to test a piece that is being worked upon without putting the demagnetizing apparatus through a complete cycle. This control is effected through the "residual" switch 48, and to put this switch into circuit, the operator manually moves the switch 132 from the "power" position indicated in the circuit, to the opposite or "residual" position. The circuit is then closed from the switch 134 through the switch 132 to the switch 48. The switch 48 up to this time has assumed the position indicated in full lines in which the circuit is closed to the motor 36 in forward direction. Upon throwing the switch from "Power" to "Residual" position, the motor 36 is rotated to move the switch arm 32 from the "home" position (which may be either upper or lower extreme positions, but assume for convenience the upper position shown in full lines in the diagram). Upon rotation of the motor 36 as just indicated, the switch arm 32 is rotated clockwise, and when it reaches the position indicated in dotted lines at 32a between the starting element $34_0$ and the next adjacent one at station No. 1, the cam 42 on the rotor engages the switch blade of the switch 48 and moves it from the position in which it was resting, as explained above. If the inertia of the motor should be sufficient to carry the switch arm 32 beyond the desired position, the switch blade of the switch 48 would close the circuit in the opposite direction for reversing the motor and hence reversing the rotor for consequently reversing the switch arm 32 so that it stops at the desired position indicated. The operator, rather than being required to completely cycle the demagnetizing apparatus, may, after performing the operation just described, move table 12 (Fig. 1) from an operating position for exposing the work piece on the chuck 16. He may then want to remove, for example, one of a number of pieces held thereon for checking its dimensions, and replace it for further operation, without removing all of the pieces on the chuck. This operation, therefore, provides a quick and convenient method of opening the demagnetizing circuit temporarily for performing the test indicated, without the necessity of completely cycling the apparatus.

If it should be desired to impose a lesser voltage on the chuck than the full voltage allowable, the operator may desire to set the potentiometer 146 at a selected voltage less than the full voltage of the transformer. To do this he moves the switch means 138 and 144 from the full line position to the dotted line position, whereupon the circuit is from the secondary 120s, through the primary 124p of the transformer 124, conductor 126, switch means 106, conductor 52, switch arm 32, contact terminal element $34_0$, conductor 140, conductor 142, potentiometer 146, and conductor 148 to the secondary 120s. The potentiometer 146 enables the operator to impose a selected voltage value on the chuck rather than, for example, the full voltage of the transformer secondary 120s.

Advantages of interrupting the current through the A. C. supply circuit are numerous. There is substantially no counter E. M. F. such as has been encountered heretofore in arrangements in which the D. C. circuit has been varied for varying the voltage imposed on the electromagnet. In interrupting the A. C. circuit, the transformer connected thereto may be easily and conveniently tapped at selected different voltage value points. The demagnetizing operation is extremely fast. Appreciably less power is required than in the case of previous instances in which, for example, a resistance is imposed in the D. C. circuit. In such previous cases, an additional reserve of power was required for producing the reverse magnetization effect whereas in the present case, only that power necessary for producing the initial given magnetization is required, and only the voltage according to the nominal voltage of the magnetization at any step in the series of voltage values.

Because of the less time required for demagnetization, the wear imposed on the physical and mechanical elements is reduced to a minimum. The absence of a resistance in series with the electromagnet and the low impedance in the circuit, results in completion of the reversing demagnetizing steps in a minimum time interval with consequent minimum overall time required for the demagnetizing operation.

While I have shown herein a preferred embodiment of the invention, it is understood that changes may be made therein within the scope of the appended claims.

I claim:

1. Apparatus for demagnetizing an electromagnet comprising a source of alternating current including first circuit means, rectifying means for converting the alternating current to direct current, circuit means for transmitting the direct current to the electromagnet, cycling means operable through a predetermined cycle, means controlled by said cycling means and operable at a predetermined number of intervals in a cycle of operation for interrupting said first circuit means and thus the alternating current at full voltage value of the alternating current and re-establishing it, and maintaining the alternating current so established for such period of time and at such value of voltage at the respective ones of said intervals that the magnetization imposed on the electromagnet is progressively decreased in successive ones of said intervals, and means operable during each interruption for reversing the polarity of the direct current transmitted to the electromagnet.

2. The apparatus set out in claim 1, in which the means for decreasing the magnetization imposed on the electromagnet is operative for so decreasing it by decreasing the value of the voltage of the alternating current in successive ones of said intervals.

3. The apparatus set out in claim 2, in which transformer means including a secondary winding is included in the first circuit means of the alternating current source as a serial portion thereof, and the means for decreasing the value of the voltage includes, and is operative for so decreasing the value of the voltage by means of, means for tapping the secondary winding of the transformer at different points.

4. The apparatus set out in claim 3 in which the transformer means includes a first and second transformer, circuit means is provided connecting the primary of the second transformer serially with the secondary of the first transformer so that the former derives its current from the latter, the rectifying means and electromagnet are connected with and derive their current from the secondary of the second transformer, and the tappings are made in the secondary of the first transformer for connecting the primary of the second transformer at corresponding voltage value points therewith.

5. Apparatus for demagnetizing an electromagnet comprising, a source of alternating current, cycling means for intermittently interrupting the alternating current at the source, at full voltage value, a predetermined number of times in a cycle of operation, said cycling means including means for decreasing the value of the voltage of the alternating current at successive ones of said times in the cycle of operation, means for converting the alternating current to direct current, circuit means of low impedance for transmitting direct current to the electromagnet, whereby to effect maximum reverse magnetization with minimum voltage current source and less than that required to produce the next previous magnetization, and means for reversing the polarity of the direct current at the intervals of interruption.

6. Means for demagnetizing an electromagnet comprising, a source of alternating current including a transformer connected serially therein, means for tapping the secondary of the transformer including a plurality of conductors connected at successively decreasing voltage value points along the transformer, terminal contact elements connected with the respective conductors, a rotor for serially contacting the contact elements and moving off of each contact element before contacting the next, means including a switch completing circuit with the transformer and contact elements and rotor, rectifying means for converting the alternating current from the transformer to direct current, circuit means for delivering the direct current to the electromagnet, reversing switch means in the latter circuit means for reversing the polarity of the direct current, and driving means including a common movable member for rotating said rotor and serially placing the contact elements in the associated circuit portions and operating the reversing switch means at each interval between contacts.

7. The apparatus set out in claim 6 in which the driving means includes means operable for sequentially opening the switch in the circuit between the transformer and contact elements and rotor while the rotor is in contact with each contact element, operating the reversing switch means after the said switch is open, and, after the rotor contacts the next succeeding contact element, then closing the switch.

8. The apparatus set out in claim 6 in which the driving means including an electric motor, and a limit switch is provided, controlled by the rotor, for stopping the motor after the rotor has passed the last of the contact elements.

9. The apparatus set out in claim 8 in which the motor and rotor are normally at rest in a position in which the rotor is in contact with one of the contact elements, a first limit switch is provided, manually settable and controlled by the rotor, for stopping the motor after the rotor has passed the last of the contact elements, and a second limit switch is also provided, manually settable and controlled by the rotor, for actuating the motor for moving the rotor from its rest position to an adjacent open-circuit position between contact elements.

10. The apparatus set out in claim 9 in which the motor is reversible, and an additional limit switch is provided, controlled by the rotor, for reversing the motor after the rotor passes the last of the contact elements and moves a predetermined distance toward the first of the contact elements whereby it is prevented from again correlating with the first of the contact elements in a next rotation and whereby to stop the motor at an open circuit position after the last of the contact elements.

11. The apparatus set out in claim 6, in which the driving means is of uniform speed.

12. The method of demagnetizing an electromagnet comprising, supplying alternating current, converting the alternating current to direct current and transmitting it to the electromagnet, intermittently interrupting the alternating current at full voltage value at a predetermined number of periods in a cycle, reversing the polarity of the direct current at each interruption of the alternating current, and varying the ratio between the voltage value of the current and the time interval of the period of interruption so as to produce progressively decreased magnetization in the electromagnet in successive ones of said periods.

13. The method set out in claim 12 in which magnetization is decreased by decreasing the voltage value of the alternating current.

14. The method set out in claim 13 in which the periods are maintained constant and the voltage values are decreased sufficiently to produce the decrease in magnetization.

15. The method of demagnetizing an electromagnet comprising, supplying alternating current, converting the alternating current to direct current and transmitting it to the electromagnet, intermittently interrupting the alternating current at full voltage value at a plurality of periods in a cycle, reversing he polarity of the direct current at each interruption of the alternating current, and varying the ratio between the voltage value of the current and the time interval of the period of interruption so as to produce progressively decreased magnetization in the electromagnet in successive ones of said periods.

References Cited in the file of this patent
UNITED STATES PATENTS

| | | |
|---|---|---|
| 2,019,320 | Runner | Oct. 29, 1935 |
| 2,632,035 | Jaeger | Mar. 17, 1953 |

Disclaimer 2,825,854.—*Arthur K. Littwin*, Lincolnwood, Ill. APPARATUS FOR AND METHOD OF DEMAGNETIZING. Patent dated Mar. 4, 1958. Disclaimer filed July 29, 1963, by the assignees, *Robert L. Littwin, Arthur K. Littwin* and *Horace A. Young, Trustees of Littwin Family Trust No. 1.*

Hereby enter this disclaimer to claims 1, 12 and 15 of said patent.
[*Official Gazette October 22, 1963.*]

Notice of Adverse Decision in Interference

In Interference No. 90,525 involving Patent No. 2,825,854, A. K. Littwin, Apparatus for and method of demagnetizing, final judgment adverse to the patentee was rendered Oct. 1, 1962, as to claims 1, 12 and 15.

[*Official Gazette February 4, 1964.*]